(12) United States Patent
Hosokawa et al.

(10) Patent No.: US 7,775,316 B2
(45) Date of Patent: Aug. 17, 2010

(54) COLLIDING OBJECT DETERMINATION DEVICE AND COLLISION INFORMATION DETECTOR FOR VEHICLE

(75) Inventors: Toshio Hosokawa, Anjo (JP); Yujiro Miyata, Kariya (JP); Motomi Iyoda, Seto (JP); Ryotaro Kachu, Nishikamo-gun (JP); Hiroyuki Takahashi, Nishikamo-gun (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 11/887,031

(22) PCT Filed: Mar. 24, 2006

(86) PCT No.: PCT/JP2006/306790
§ 371 (c)(1),
(2), (4) Date: Sep. 24, 2007

(87) PCT Pub. No.: WO2006/106897
PCT Pub. Date: Oct. 12, 2006

(65) Prior Publication Data
US 2009/0050395 A1    Feb. 26, 2009

(30) Foreign Application Priority Data
Mar. 31, 2005    (JP) ............................. 2005-104940

(51) Int. Cl.
*B60D 1/28*    (2006.01)
(52) U.S. Cl. ..................................... 180/271
(58) Field of Classification Search ................ 180/271, 180/274; 280/735
See application file for complete search history.

(56) References Cited

U.S. PATENT DOCUMENTS

| | | | |
|---|---|---|---|
| 6,540,275 B1 * | 4/2003 | Iwamoto et al. | 293/24 |
| 6,557,889 B2 * | 5/2003 | Breed | 280/735 |
| 6,607,212 B1 | 8/2003 | Riemer et al. | |
| 6,832,145 B2 * | 12/2004 | Takafuji et al. | 701/45 |
| 6,929,282 B1 * | 8/2005 | Zoratti et al. | 280/735 |

(Continued)

FOREIGN PATENT DOCUMENTS

DE    10256952 A1    6/2004

(Continued)

OTHER PUBLICATIONS

Office Action dated Dec. 5, 2008 in Chinese Application No. 2006 8001 0419.9.

(Continued)

*Primary Examiner*—Faye M. Fleming
(74) *Attorney, Agent, or Firm*—Harness, Dickey & Pierce, PLC

(57) ABSTRACT

A colliding object determination device for a vehicle having a bumper reinforcement member (12) includes a sensor (20) and a determination circuit (40). The sensor (20) is located in a front portion of a vehicle for measuring a collision state quantity correlating with a collision load generated in a collision of a colliding body with the vehicle. The determination circuit (40) determines whether the colliding body is a pedestrian based on the measured collision state quantity. The sensor (20) is located on an upper half region of a front end face of the bumper reinforcement member (12). Thus, accuracy of discriminating the pedestrian from other objects can be improved.

17 Claims, 10 Drawing Sheets

U.S. PATENT DOCUMENTS

| | | | |
|---|---|---|---|
| 6,997,060 B2 | 2/2006 | Morikawa | |
| 7,036,621 B2 * | 5/2006 | Takafuji et al. | 180/274 |
| 7,098,778 B1 | 8/2006 | Zoratti et al. | |
| 7,236,866 B2 * | 6/2007 | Takafuji et al. | 701/45 |
| 7,416,043 B2 * | 8/2008 | Pipkorn et al. | 180/274 |
| 7,552,792 B2 * | 6/2009 | Hawes et al. | 180/274 |
| 2006/0025912 A1 * | 2/2006 | Haering et al. | 701/45 |
| 2008/0100046 A1 * | 5/2008 | Hayakawa et al. | 280/735 |

FOREIGN PATENT DOCUMENTS

| | | |
|---|---|---|
| DE | 10333732 B3 | 12/2004 |
| EP | 1 702 809 | 9/2006 |
| JP | 7-36204 | 7/1995 |
| JP | 07190732 A | 7/1995 |
| JP | 08216826 A | 8/1996 |
| JP | 3053518 | 8/1998 |
| JP | 11-310095 | 11/1999 |
| JP | 2000-065654 | 3/2000 |
| JP | 2000-254888 | 9/2000 |
| JP | 2001-039242 A | 2/2001 |
| JP | 2001-088634 | 4/2001 |
| JP | 2005-053425 | 3/2005 |
| JP | 2005-156528 | 6/2005 |
| JP | 2005-186676 | 7/2005 |
| JP | 2006-258512 | 9/2006 |
| JP | 2006-272988 | 10/2006 |
| JP | 2009154678 A * | 7/2009 |
| WO | 01/23224 A | 4/2001 |
| WO | 2004/033261 A | 4/2004 |

OTHER PUBLICATIONS

Office Action dated Apr. 15, 2008 in Japanese Application No. 2005-104940 with English translation.

Office Action dated Jul. 7, 2009 in corresponding Japanese Application No. 2005-104940.

Office Action dated Sep. 2, 2008 in Japanese Application No. 2005-104940 with English translation.

Notice of Preliminary Rejection dated Oct. 15, 2008 in Korean Application No. 10-2007-7024017 with English translation.

Examination Report dated Oct. 17, 2008 in European Application No. 06 730 738.9.

Office Action dated Nov. 6, 2009 in corresponding Chinese Application No. 2006 80010419.9.

* cited by examiner

US 7,775,316 B2

COLLIDING OBJECT DETERMINATION DEVICE AND COLLISION INFORMATION DETECTOR FOR VEHICLE

CROSS-REFERENCE TO RELATED APPLICATIONS

This application is a National Stage of International application No. PCT/JP2006/306790, filed Mar. 24, 2006 and published in English as WO 2006/106897 A1 on Oct. 12, 2006. This application claims the benefit of JP 2005-104940, filed Mar. 31, 2005. The disclosure(s) of the above applications are incorporated herein by reference.

TECHNICAL FIELD

The present invention relates to a colliding object determination device and a collision information detector for vehicle. In particular, the present invention relates to a device capable of properly detecting a collision of a pedestrian with a bumper.

BACKGROUND ART

There has been a variety of collision detection sensors mounted to a bumper of a vehicle for detecting a collision of a colliding body such as a pedestrian based on a collision load of the colliding body or information associated with the collision load.

A colliding body determination device for pedestrian collision detection described in JP-A-H08-216826 detects a collision of a pedestrian by using a bumper sensor and a hood sensor. The bumper sensor is located between a bumper cover and a bumper absorber for detecting a load applied from a front side in a horizontal direction. The hood sensor detects a load applied from above.

A collision information detector described in JP-A-H07-190732 has a light-emitting circuit section at one end of an optical fiber extending in the horizontal direction and a light-receiving circuit section at the other end of the optical fiber. The collision information detector determines a collision based on a transmission loss of the optical fiber due to the collision.

A vehicle front body structure described in JP-A-2001-39242 has a pedestrian bumper under a front bumper. The pedestrian bumper can protrude forward of the front bumper, suitably laying a pedestrian over a hood in a collision with the pedestrian.

In the real world, there exists a colliding body having a load, which is input into a load sensor in the collision, similar to that of a pedestrian. In addition, the masses of the pedestrians vary (for example, children are light in weight). Therefore, it is not easy for conventional colliding body determination devices to perform the discrimination of the colliding bodies appropriately. The colliding body determination device described in JP-A-H08-216826 can improve pedestrian determination accuracy since the device detects the falling of the pedestrian over the hood. However, the hood sensor cannot transmit an output until the pedestrian falls over the hood after the collision. Therefore, an operable time of a pedestrian protection device after that is very short. Moreover, the device structure is complicated.

In the case where the optical fiber sensor is used as the load sensor, i.e., a sensor for converting a physical quantity associated with a collision force into an electric quantity, as in JP-A-H07-190732, the light-emitting circuit section and the light-receiving circuit section have to be positioned in the right and left ends of the vehicle respectively. Thus, the circuit arrangement is complicated.

DISCLOSURE OF THE INVENTION

It is an object of the present invention to provide a device capable of accurately discriminating a pedestrian from a lightweight object by using a simple device structure.

According to an aspect of the present invention, a colliding object determination device for a vehicle has a sensor and a determination circuit. The sensor is located in a front portion of the vehicle for detecting a collision state quantity correlating with a collision load generated in a collision of a colliding body with a vehicle. The determination circuit determines whether the colliding body is a pedestrian based on the detected collision state quantity. The sensor is located on an upper half region of a front end face of a bumper reinforcement member. Accordingly, accuracy of determining the pedestrian can be significantly improved compared to the case where the sensor is located over the entire front end face of the bumper reinforcement member or at the center portion of the front end face of the bumper reinforcement member with respect to the vertical direction.

BEST MODES FOR CARRYING OUT THE INVENTION

Figure 1:
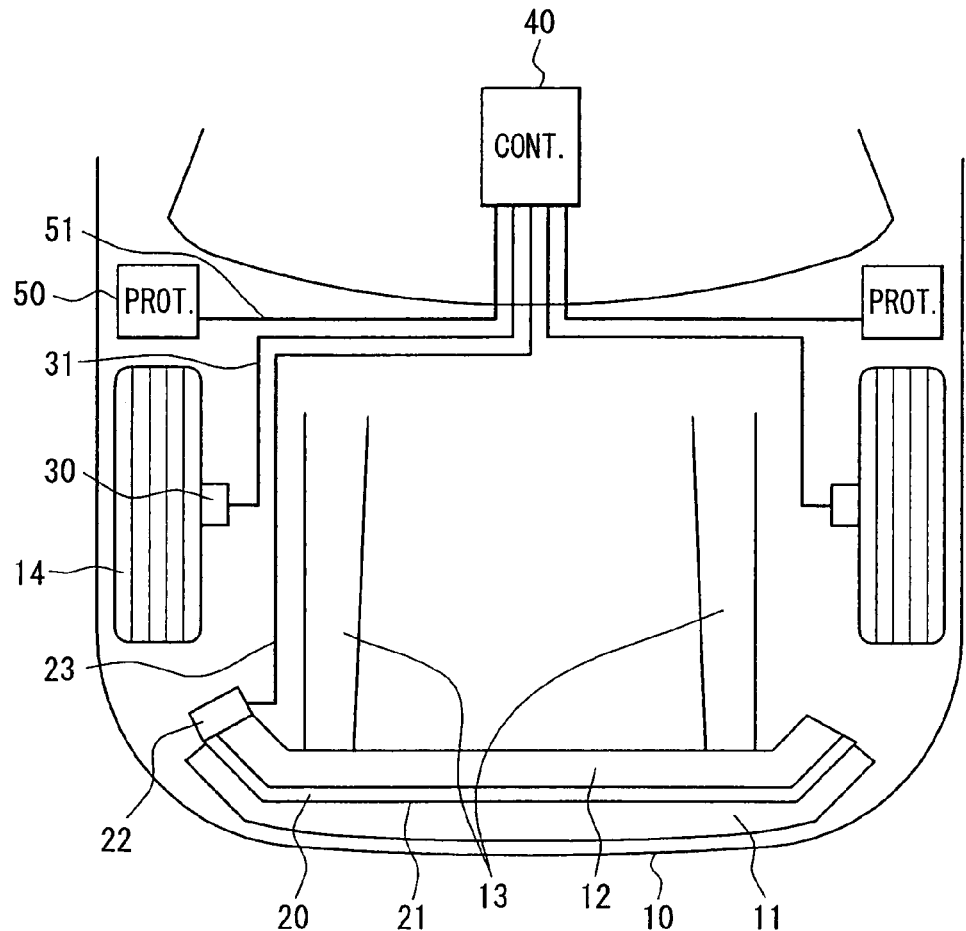
FIG. 1 is a schematic perspective plan view showing a front portion of a vehicle according to an example embodiment of the present invention.

Referring to FIG. 1, a front portion of a vehicle according to an example embodiment of the present invention is illustrated. In this example embodiment, the present invention is applied to pedestrian detection. The front portion of the vehicle has a bumper cover 10, a bumper absorber 11, a bumper reinforcement member 12, side members 13, vehicle wheels 14, an optical fiber sensor 20, a load transmission plate 21, a sensor circuit 22, a wiring 23, a vehicle speed sensor 30, a wiring 31, a control section 40, a pedestrian protection device 50, a wiring 51, and the like. The optical fiber sensor 20, the load transmission plate 21 and the sensor circuit 22 constitute a collision load sensor (leak optical fiber sensor) for measuring a collision state quantity. A signal of a light amount measured by the sensor circuit 22 correlates with a collision load and is output to the control section 40 through the wiring 23. The vehicle speed sensor 30 measures rotation speed of the vehicle wheel 14. The signal of the measured vehicle speed is output to the control section 40 through the wiring 31. The pedestrian protection device 50 is a known pedestrian air bag device or a known hood lifting mechanism, for example. The control section 40 performs calculation with the input signals to determine whether a colliding body is a pedestrian. If the control section 40 determines that the colliding body is a pedestrian, the control section 40 operates the protection device 50 to protect the pedestrian.

Next, a detailed structure of the leak optical fiber sensor of this example embodiment will be explained with reference to FIGS. 2 to 4.

A variety of known structures of an optical fiber 201 may be employed. An outer peripheral surface of the optical fiber 201 should preferably not have a covering layer such as a metallic coating that restrains optical leaks to an outside.

Figure 2:
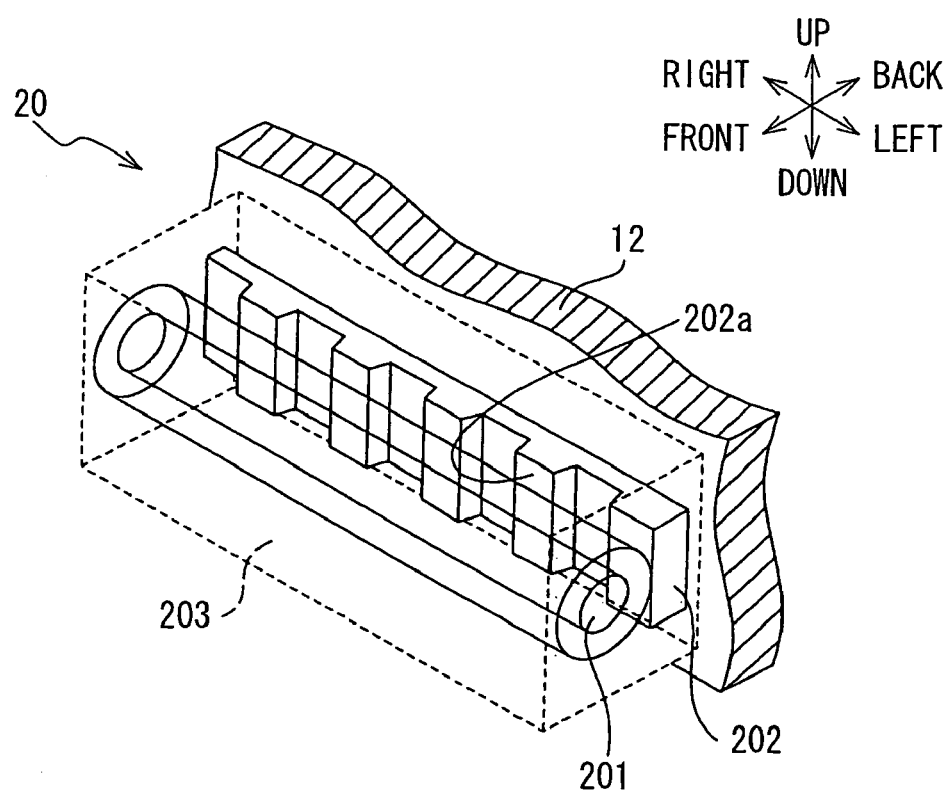
FIG. 2 is an enlarged perspective view showing an optical fiber sensor according to the FIG. 1 embodiment.

In the example embodiment illustrated in FIG. 2, the optical fiber 201 and a concave-convex member 202 are accommodated in a linear rubber body 203 having a rectangular cross-section. The linear rubber body 203 extends in the side-to-side direction of the vehicle while closely contacting with a front end face of the bumper reinforcement member 12. Thus, the optical fiber 201 is positioned ahead of the front end face of the bumper reinforcement member 12 by a predetermined small distance such that the optical fiber 201 extends in the side-to-side direction of the vehicle. The concave-convex member 202 is formed with convex portions 202a and concave portions along the side-to-side direction of the vehicle with a predetermined pitch. The convex portions 202a are in contact with the optical fiber 201. The convex portions 202a and concave portions may be formed in a wave shape. In the example embodiment illustrated in FIGS. 3 and 4, the load transmission plate 21 is located to closely contact with a front end face of the linear rubber body 203 in a position overlapping with the optical fiber 201 in the vertical direction such that the load transmission plate 21 extends in the side-to-side direction of the vehicle. The optical fiber 201 includes an outward fiber part and a homeward fiber part. The outward fiber part extends from one end side to the other end side of the bumper reinforcement member 12 in the side-to-side direction of the vehicle while closely contacting with an upper half portion of the front end face of the bumper reinforcement member 12. The optical fiber 201 makes a U-turn at a connection between the outward fiber part and the homeward fiber part on the other end side of the bumper reinforcement member 12. The homeward fiber part extends from the other end side to the one end side of the bumper reinforcement member 12 in the side-to-side direction of the vehicle while closely contacting with the upper half portion of the front end face of the bumper reinforcement member 12 under the outward fiber part.

Figure 4:
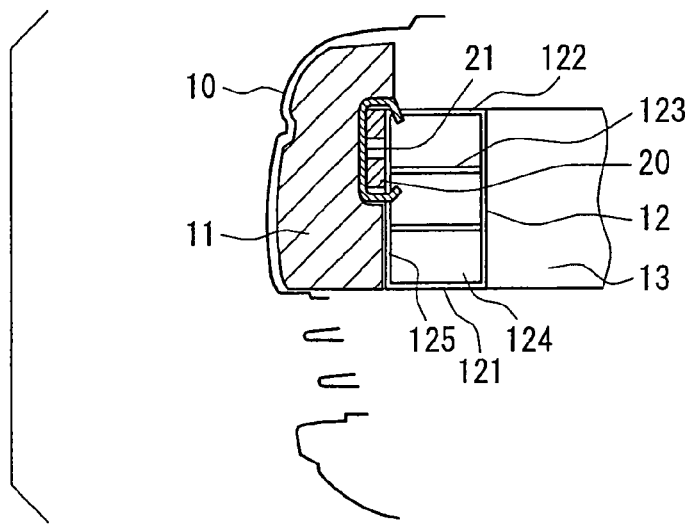
FIG. 4 is a cross-sectional view showing the vicinity of the bumper according to the FIG. 1 embodiment.

The load transmission plate 21 is located between the bumper absorber 11 and the optical fiber sensor 20 as shown in FIG. 4.

The sensor circuit 22 has a light-emitting diode (light-emitting circuit section), a photo transistor (light-receiving circuit section), and a signal processing circuit section. The light-emitting diode emits light to a base end face of the outward fiber part of the optical fiber 201. The photo transistor converts the light emitted from a front end face of the homeward fiber part of the optical fiber 201 into a signal voltage. The signal processing circuit section amplifies an output signal voltage of the photo transistor and converts the output signal voltage into a digital signal.

A principle of collision detection using the above-mentioned optical fiber sensor will be explained below.

If a colliding body collides with a certain area of the bumper cover 10, the bumper cover 10 and the bumper absorber 11 at the collision area are deformed backward to push the load transmission plate 21 backward. Accordingly, the load transmission plate 21 pushes the optical fiber 201 through the linear rubber body 203. At that time, portions of the optical fiber 201 contacting with the convex portions 202a of the concave-convex member 202 do not move backward, but portions of the optical fiber 201 corresponding to the concave portions move backward. As a result, the optical fiber 201 is bent particularly at the portions to which the collision load is applied. Accordingly, the light in the optical fiber 201 leaks from the optical fiber 201 to an outside. The deformation of the optical fiber 201 and an optical leak amount increase as the collision load increases. An output voltage of a detection circuit section of the sensor circuit 22 also changes correspondingly. Thus, the optical fiber sensor serves as a collision load sensor. The optical fiber sensor may also serve as a collision detection sensor.

Figure 5A:
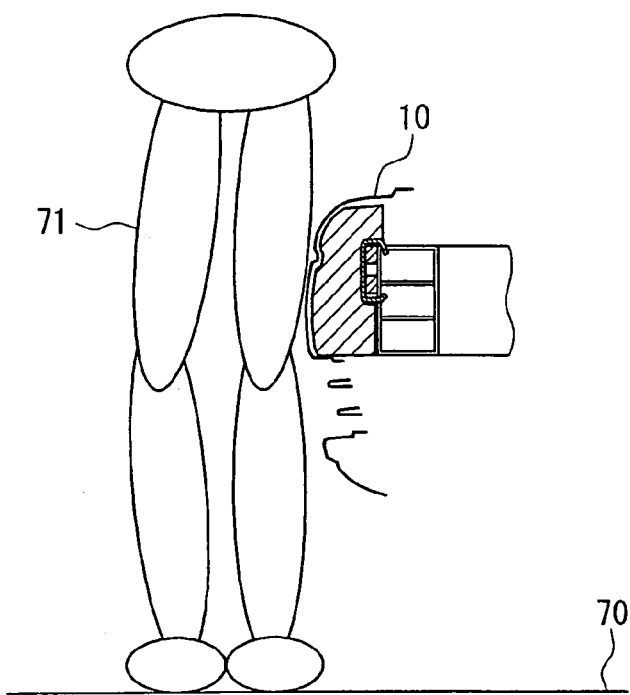
FIG. 5A is a schematic diagram showing a state immediately before a bumper cover according to the FIG. 1 embodiment collides with a leg of a pedestrian.
Figure 5B:
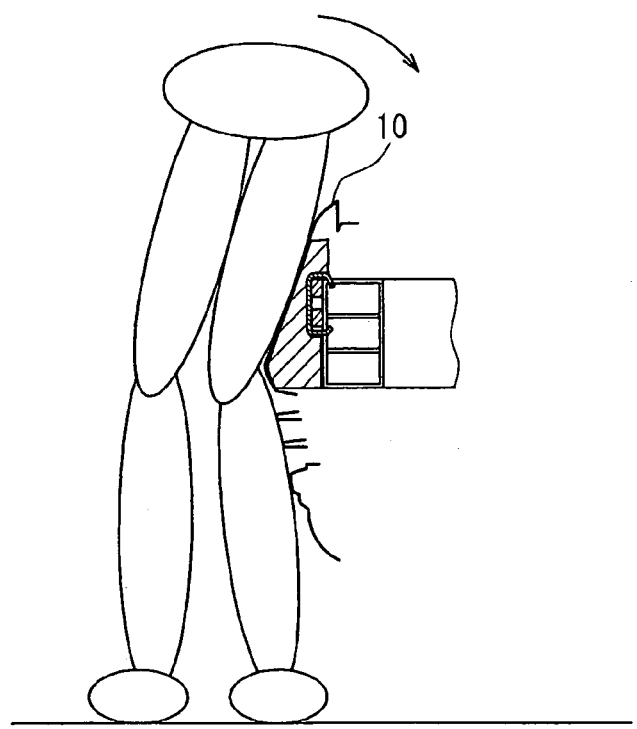
FIG. 5B is a schematic diagram showing a state in which the bumper cover according to the FIG. 1 embodiment is deformed due to the collision with the pedestrian.

Next, an instance in which a pedestrian 71 collides with the bumper cover 10 will be explained with reference to FIGS. 5A and 5B. FIG. 5A shows a state immediately before the bumper cover 10 collides with a leg of the pedestrian 71. A numeral 70 in FIG. 5A indicates a ground. FIG. 5B shows a state in which the bumper cover 10 is deformed due to the collision. If the pedestrian collides with a vehicle, the upper body of the pedestrian falls over the hood because the gravity center of the pedestrian is higher than the bumper and the pedestrian's body is flexible. At that time, the leg is bent, and thereafter, the pedestrian's body is thrown up. Since the bumper cover 10 is also flexible, the front end face of the bumper cover 10 is deformed obliquely as shown in FIG. 5B. At that time, a large load is applied to an upper portion of the front face of the bumper reinforcement member 12 on which the sensor 20 is mounted, due to the falling of the upper body. That is, the load converges in the upper portion of the bumper reinforcement member 12. In this example embodiment, the optical fiber sensor 20 is located adjacent to the upper half portion of the front end face of the bumper reinforcement member 12. Therefore, in this example embodiment, an optical leak amount of the optical fiber sensor 20 can be increased and detection accuracy can be improved because of the increase in the optical leak amount, compared to the case where the optical fiber sensor 20 is located on the center or lower half portion of the front end face of the bumper reinforcement member 12, for the same Vehicle speed.

Figure 6A:
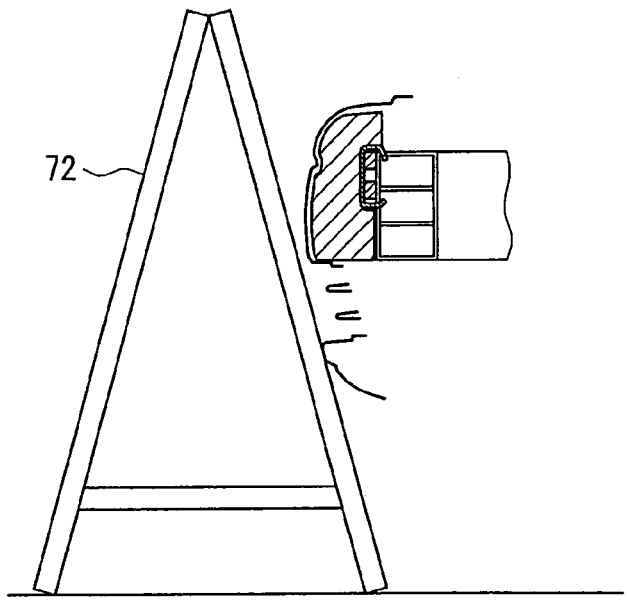
FIG. 6A is a schematic diagram showing a state immediately before the bumper cover according to the FIG. 1 embodiment collides with a barrier.
Figure 6B:
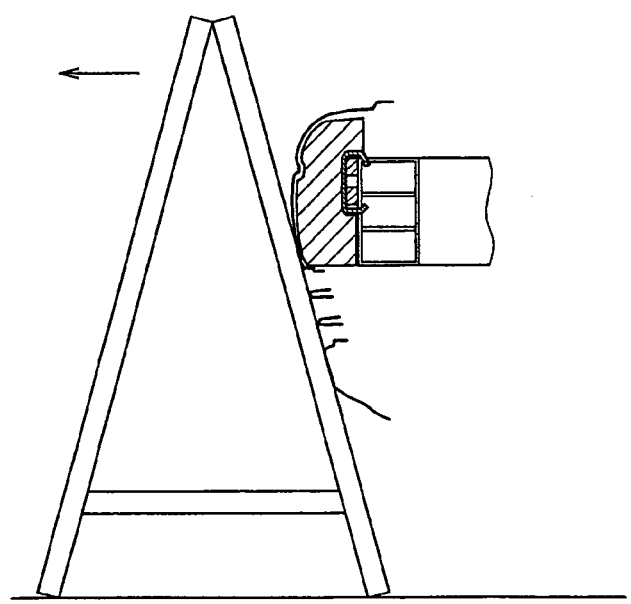
FIG. 6B is a schematic diagram showing a state in which the bumper cover according to the FIG. 1 embodiment is deformed due to the collision with the barrier.

Next, an instance in which a lightweight object located on a roadside collides with the bumper cover 10 will be explained with reference to FIGS. 6A and 6B by taking a barrier (construction barrier) 72 as an example of the lightweight object. FIG. 6A shows a state immediately before the bumper cover 10 collides with the barrier 72. FIG. 6B shows a state in which the bumper cover 10 is deformed due to the collision. As shown in FIGS. 6A and 6B, the barrier 72 has a triangular shape as seen from the side face. Therefore, the load is applied to the lower portion of the bumper cover 10 in the collision. That is, the load converges in the lower portion of the bumper reinforcement member 12. In this example embodiment, the optical fiber sensor 20 is located adjacent to the upper half portion of the front end face of the bumper reinforcement member 12. Thus, the optical fiber sensor 20 is located in a position distant from a collision area between the barrier 72 and the bumper cover 10. Therefore, an optical leak amount of the optical fiber sensor 20 is relatively small, compared to the case where the optical fiber sensor 20 is located on the center or lower half portion of the front end face of the bumper reinforcement member 12.

Figure 7:
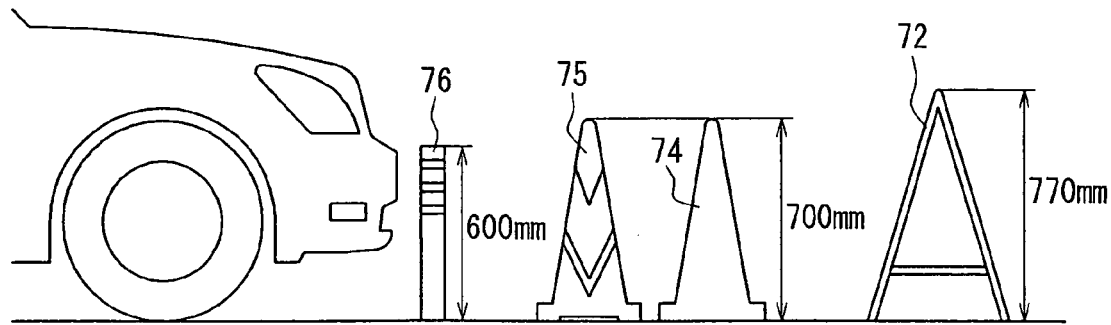
FIG. 7 is a schematic diagram showing a positional relation between obstacles and the bumper cover.

The input state of the load into the optical fiber sensor 20 in the collision between the barrier 72 and the bumper cover 10 is essentially common to a load input state in a collision with a pylon 74 or a rubber pylon 75 having a triangular shape as seen from the side face or a post cone 76 fixed to a road surface as shown in FIG. 7, for example.

Next, experiment results obtained by using a pedestrian dummy and a barrier will be explained with reference to FIGS. 8A to 10B.

Figure 8A:
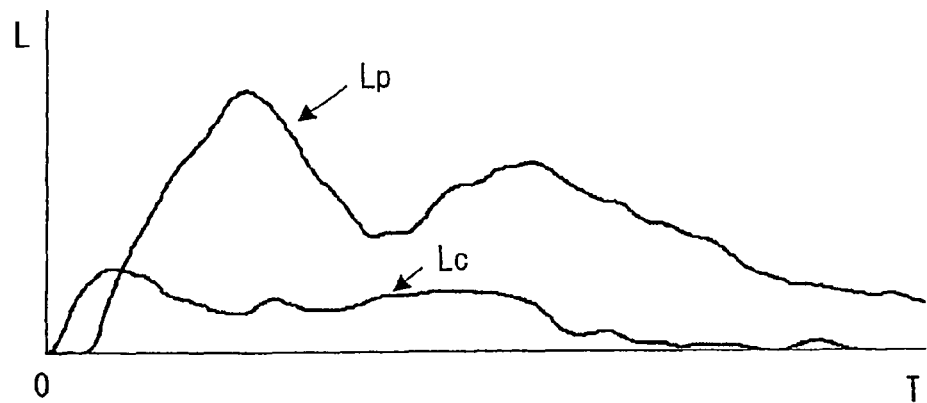
FIG. 8A is a time chart showing temporal changes of a collision load according to the FIG. 1 embodiment.
Figure 8B:
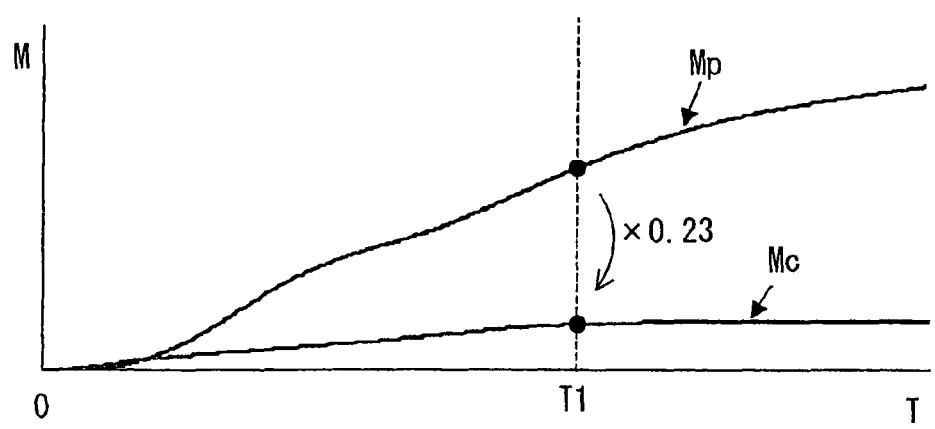
FIG. 8B is a time chart showing temporal changes of a collision mass according to the FIG. 1 embodiment.

FIG. 8A shows temporal changes of the collision load L in the collision in the case of the arrangement example of the optical fiber sensor 20 shown in FIG. 4. The temporal change of the load L generated in the collision with a pedestrian dummy at the vehicle speed of 40 km/h is indicated by a solid line Lp. The temporal change of the load L generated in the collision with a construction barrier at the vehicle speed of 60 km/h is indicated by a solid line Lc. FIG. 8B shows temporal changes of a collision mass (effective mass) M. The effective mass M is calculated from a time integration value of the load L and the vehicle speed at the time of the collision. The effective mass M corresponding to the pedestrian dummy is indicated by a solid line Mp and the effective mass M corresponding to the construction barrier is indicated by a solid line Mc. As shown in FIG. 8B, the effective mass of the pedestrian dummy is more than four-times the effective mass of the construction barrier when a certain time T1 elapses after the start timing of the collision.

Figure 9:
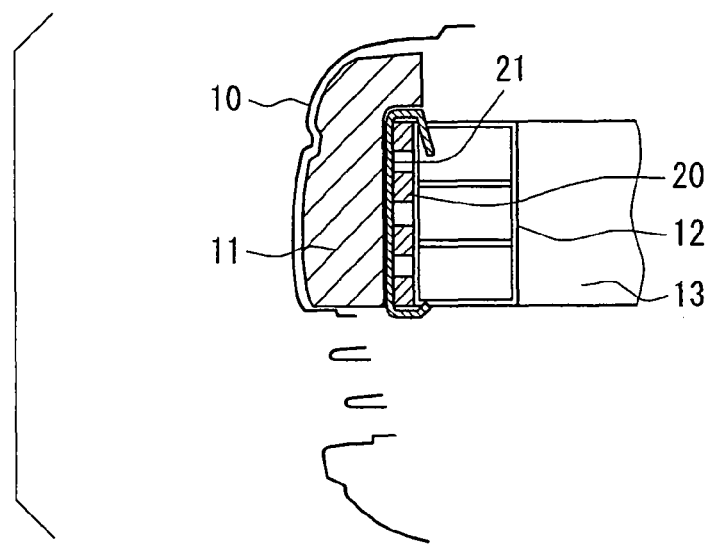
FIG. 9 is a schematic cross-sectional view showing an optical fiber arrangement of a comparative example.
Figure 10A:
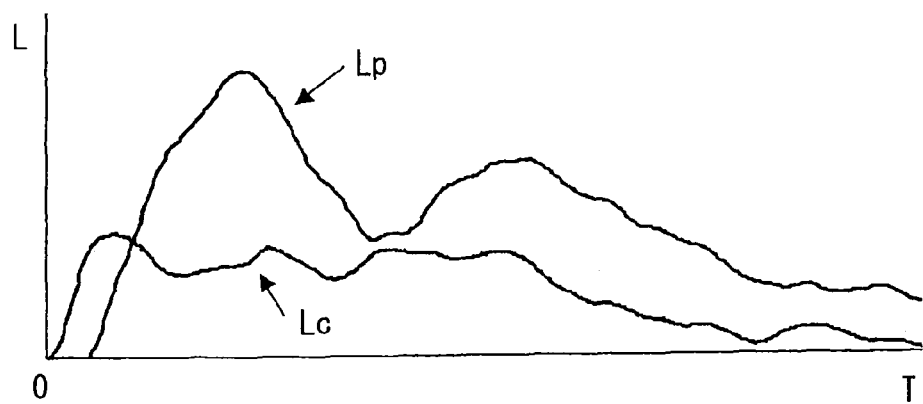
FIG. 10A is a time chart showing temporal changes of a collision load of the comparative example.
Figure 10B:
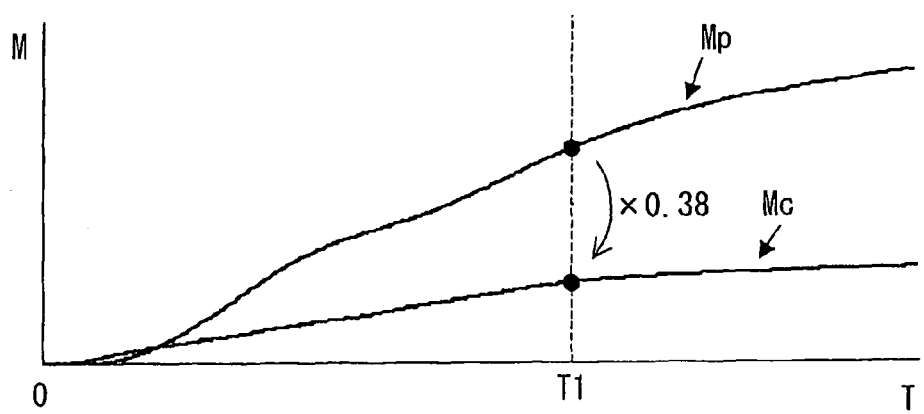
FIG. 10B is a time chart showing temporal changes of a collision mass of the comparative example.

Next, experiment results of a comparative example shown in FIG. 9 will be explained. In the comparative example shown in FIG. 9, another turn of optical fiber sensor 20 is located on a lower half portion of the front end face of the bumper reinforcement member 12 in addition to the optical fiber sensor 20 shown in FIG. 4. Accordingly, in this comparative example, four fiber parts of the optical fiber sensors 20 are located with an equal pitch with respect to the vertical direction. Temporal changes of the load L in the collision in the case of the comparative example of FIG. 9 are shown in FIG. 10A. The temporal change of the load L generated in the collision with a pedestrian dummy at the vehicle speed of 40 km/h is indicated by a solid line Lp. The temporal change of the load L generated in the collision with a construction barrier at the vehicle speed of 60 km/h is indicated by a solid line Lc. Temporal changes of the collision mass (effective mass) M in the case of the comparative example of FIG. 9 are shown in FIG. 10B. The effective mass M corresponding to the pedestrian dummy is indicated by a solid line Mp and the effective mass M corresponding to the construction barrier is indicated by a solid line Mc. As shown in FIG. 10B, the effective mass of the pedestrian dummy is less than three-times the effective mass of the barrier when the certain time T1 elapses after the start timing of the collision.

It is found out from these results that accuracy of discrimination of the pedestrian 71 from the barrier 72 can be significantly improved by properly choosing the arrangement of the optical fiber sensor 20, as in this example embodiment shown in FIG. 4. A notable effect can be exerted particularly when the collision mass (effective mass) of the pedestrian is close to the effective mass of the other colliding object than the pedestrian, for example, when the pedestrian is a child, who is lightweight.

Figure 3:
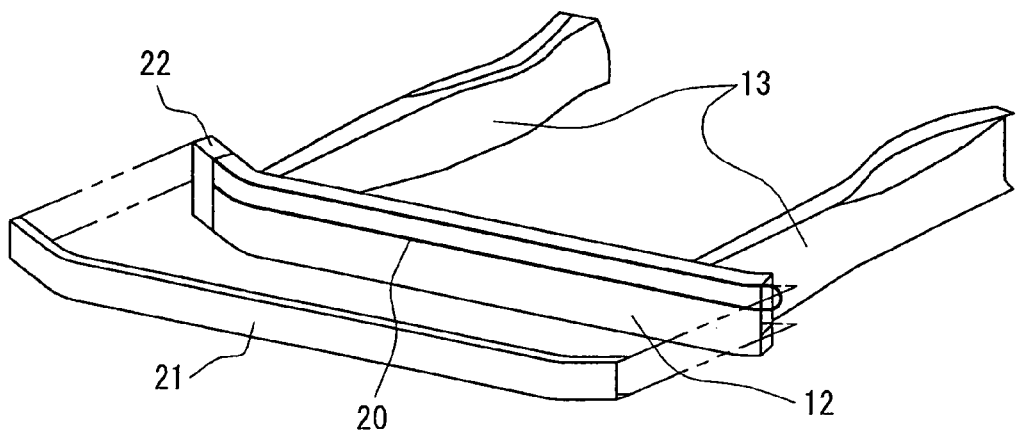
FIG. 3 is a perspective view showing the vicinity of a bumper of the vehicle according to the FIG. 1 embodiment.

In the example embodiment illustrated in FIG. 3, only one turn of the optical fiber sensor 20 is provided. Alternatively, the front end of the optical fiber sensor 20 on the sensor circuit 22 side may be extended to increase the turn by a predetermined number. In this case, the turn(s) continuing from the first turn shown in FIG. 3 should be extended under the first turn.

Another concave-convex member having the same shape as the concave-convex member 202 shown in FIG. 2 may be added in the linear rubber body 203 on the opposite side from the concave-convex member 202 across the optical fiber 201. The convex portions of the added concave-convex member face the optical fiber 201. The convex portions of the added concave-convex member should be preferably offset from the convex portions 202a of the concave-convex member 202 by half a pitch in the side-to-side direction of the vehicle. Thus, the degree of curvature of the optical fiber 201 per certain collision load can be increased. As a result, sensitivity of the optical fiber sensor 20 can be improved.

The control section 40 incorporates a microcomputer and obtains a collision load L based on a map in accordance with a signal voltage correlating with an optical leak amount input from the sensor circuit 22. The signal voltage itself may be used as the collision load L. Then, the collision mass M is calculated by using a time integration value of the load L and the vehicle speed at the time of the collision. It is determined whether the colliding body is a pedestrian based on whether the collision mass M is within a mass range corresponding to the mass of the pedestrian. The mass range may be defined by at least one threshold value. In this case, the collision mass M may be compared with the threshold value to determine whether the collision mass M is that of the pedestrian, i.e., whether the colliding body is the pedestrian.

In the above example embodiment, the load detection using the leak optical fiber sensor is employed. Alternatively, other known load sensor such as a rubber pressure-sensitive sensor, a resistance between electrodes of which changes with pressing strength, may be located adjacent to the upper half portion of the front end face of the bumper reinforcement member 12 likewise.

Figure 11:
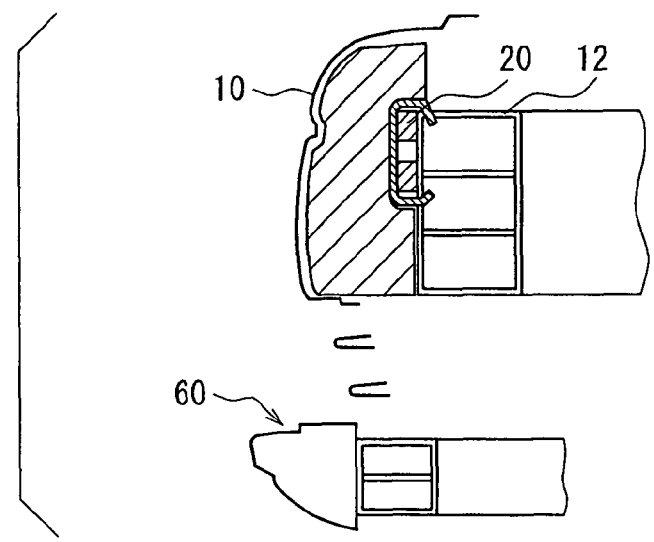
FIG. 11 is a schematic cross-sectional view showing the vicinity of a bumper of a vehicle according to another example embodiment of the present invention.
Figure 12A:
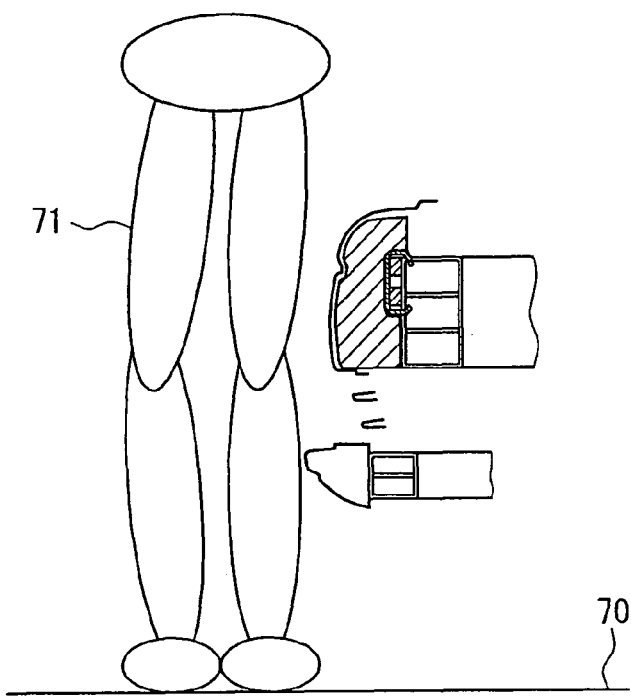
FIG. 12A is a schematic diagram showing a state immediately before a bumper cover according to the FIG. 11 embodiment collides with a leg of a pedestrian.
Figure 12B:
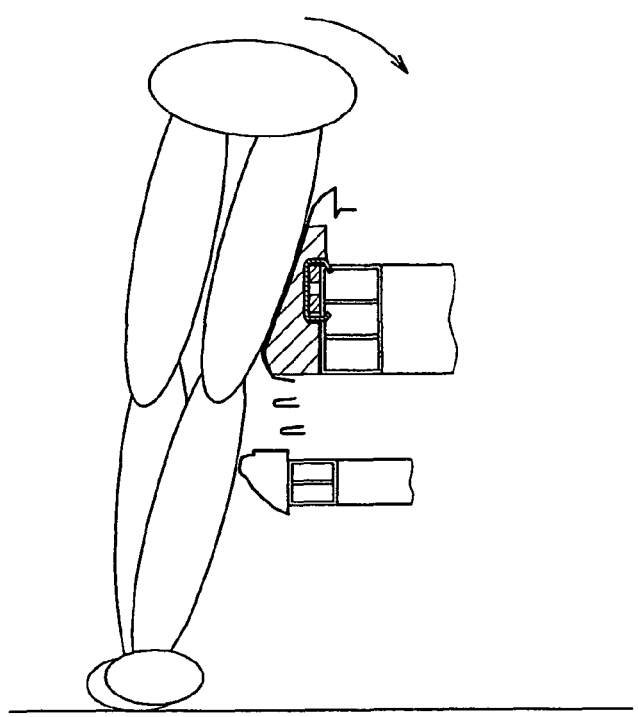
FIG. 12B is a schematic diagram showing a state in which the bumper cover according to the FIG. 11 embodiment is deformed due to the collision with the pedestrian.
Figure 13A:
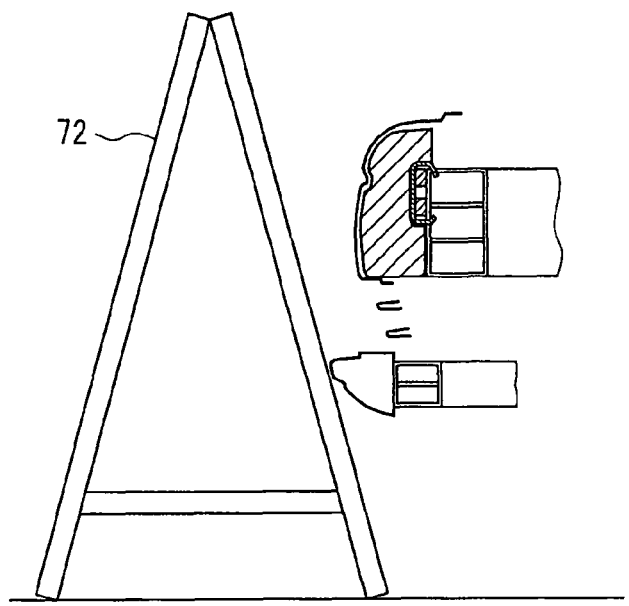
FIG. 13A is a schematic diagram showing a state immediately before the bumper cover according to the FIG. 11 embodiment collides with a barrier.
Figure 13B:
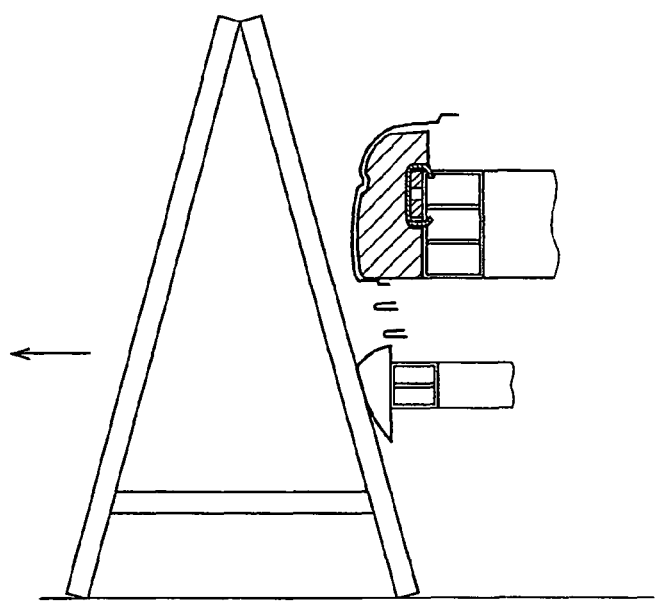
FIG. 13B is a schematic diagram showing a state in which the bumper cover according to the FIG. 11 embodiment is deformed due to the collision with the barrier.

A pedestrian bumper 60 may be arranged at the same fore-and-aft position as a normal front bumper or ahead of the normal front bumper under the normal front bumper as shown in FIG. 11. In this case, the pedestrian bumper 60 urges a lower portion of the leg of the pedestrian 71 (shin, for example) forward of the normal front bumper, so the leg of the pedestrian 71 is further inclined as shown in FIGS. 12A and 12B. Thus, an effect of improving the sensitivity due to arrangement of the optical fiber sensor 20 shown in FIG. 4 can be further increased. In the case where the vehicle having the pedestrian bumper 60 collides with the barrier 72 as shown in FIGS. 13A and 13B, the collision load is applied mainly to the pedestrian bumper 60 since the barrier 72 has the triangular shape as mentioned above. Accordingly, an effect of further reducing the load applied to the optical fiber sensor 20 can be increased. If the optical fiber sensor 20 is located on as upper a portion of the bumper reinforcement member 12 as possible, a vertical distance between the optical fiber sensor 20 and the barrier 72 increases compared to the case where the optical fiber sensor 20 is located on the lower portion of the bumper reinforcement member 12. Therefore, the load applied to the optical fiber sensor 20 can be reduced relatively.

In the example embodiment illustrated in FIG. 4, the bumper reinforcement member 21 has a side wall 121 defining a lower end wall extending in the fore-and-aft direction, a side wall 122 defining an upper end wall, and two ribs 123, 124 located inside. The side walls 121, 122 and the ribs 123, 124 are located with a predetermined pitch with respect to the vertical direction. A front end wall 125 of the bumper reinforcement member 12 is fixed to the side walls 121, 122 and the ribs 123, 124.

As shown in FIG. 4, the outward fiber part of the optical fiber sensor 20 having one turn is located at the same height as the side wall 122 in front of the side wall 122. The homeward fiber part is arranged at the same height as the rib 123 in front of the rib 123, which is below the side wall 122. Thus, the linear rubber body 203 accommodating the optical fiber sensor 20 is located on such a highly rigid portion of the bumper reinforcement member 12. Therefore, backward deformation of the bumper reinforcement member 12 in the collision can be suppressed. As a result, the deformation of the optical fiber sensor 20 is promoted and the sensitivity is improved.

Instead of bending the optical fiber 201 on the other end side of the vehicle, an end face of the optical fiber 201 may have a light reflection function to reflect light. In this case, light may be introduced into the other end face of the optical fiber 201 and may be reflected at the end face having the light reflection function. The reflected light emitted from a plane of incidence may be separated from the incident light by a half mirror or the like. Also in this case, the light-emitting circuit section and the light-receiving circuit section can be located on the same side of the vehicle with respect to the side-to-side direction of the vehicle.

The present invention should not be limited to the disclosed embodiments, but may be implemented in many other ways without departing from the scope of the invention, as defined by the appended claims.

The invention claimed is:

1. A colliding object determination device for a vehicle having a bumper reinforcement member, the colliding object determination device comprising:
    a sensor located in a front portion of the vehicle for measuring a collision state quantity correlating with a collision load generated in a collision of a colliding body with the vehicle; and
    a determination circuit for determining whether the colliding body is a pedestrian based on the measured collision state quantity, wherein
    the sensor is located on an upper half region of a front end face of the bumper reinforcement member; and
    the vehicle includes a front bumper and a pedestrian bumper, which is located at the same fore-and-aft position as the front bumper or ahead of the front bumper at least at a time of the collision, the pedestrian bumper located under the front bumper.

2. The colliding object determination device as in claim 1, wherein the sensor is located in front of a certain part of the upper half region of the front end face of the bumper reinforcement member, the certain part having higher rigidity than the other part of the upper half region of the front end face of the bumper reinforcement member.

3. The colliding object determination device as in claim 1, wherein
    the determination circuit has a determination threshold value for discriminating the collision state quantity generated in the collision with the pedestrian from the collision state quantity generated in the collision with the colliding object other than the pedestrian, and
    the determination circuit compares the collision state quantity input from the sensor with the determination threshold value.

4. A colliding object determination device for a vehicle having a bumper reinforcement member, the colliding object determination device comprising:
    a sensor located in a front portion of the vehicle for measuring a collision state quantity correlating with a collision load generated in a collision of a colliding body with the vehicle; and
    a determination circuit for determining whether the colliding body is a pedestrian based on the measured collision state quantity, wherein
    the sensor is located on an upper half region of a front end face of the bumper reinforcement member,
    the sensor includes:
    an optical fiber that extends in a side-to-side direction of the vehicle in the front portion of the vehicle and that is deformed in the collision of the colliding body with the vehicle;
    a light-emitting circuit section that introduces light to the optical fiber; and
    a light-receiving circuit section that converts the light output from the optical fiber into an electric quantity.

5. The colliding object determination device as in claim 4, wherein
    the light-emitting circuit section and the light-receiving circuit section are located on one side of the vehicle with respect to the side-to-side direction of the vehicle, and
    the optical fiber is bent at least once to make at least one U-shaped portion thereof, such that the optical fiber provides at least one outward fiber part and at least one homeward fiber part at respective positions different from each other with respect to a vertical direction.

6. The colliding object determination device as in claim 1, wherein the sensor is located outside a lower half region of the front end face of the bumper reinforcement member.

7. A colliding object determination device for a vehicle having a bumper reinforcement member, the colliding object determination device comprising:
    a sensor located in a front portion of the vehicle for measuring a collision state quantity correlating with a collision load generated in a collision of a colliding body with the vehicle; and
    a determination circuit for determining whether the colliding body is a pedestrian based on the measured collision state quantity, wherein the determination circuit determines a kind of the colliding body solely based on the collision load applied to an upper half region of a front end face of the bumper reinforcement member; wherein
    the sensor is located on a front end face of the bumper reinforcement member; and the vehicle includes a front bumper and a pedestrian bumper, which is located at the same fore-and-aft position as the front bumper or ahead of the front bumper at least at a time of the collision, the pedestrian bumper located under the front bumper.

8. The colliding object determination device as in claim 7, wherein the sensor is located in front of a certain part of the upper half region of the front end face of the bumper reinforcement member, the certain part having higher rigidity than the other part of the upper half region of the front end face of the bumper reinforcement member.

9. The colliding object determination device as in claim 7, wherein
the determination circuit has a determination threshold value for discriminating the collision state quantity generated in the collision with the pedestrian from the collision state quantity generated in the collision with the colliding object other than the pedestrian, and
the determination circuit compares the collision state quantity input from the sensor with the determination threshold value.

10. A colliding object determination device for a vehicle having a bumper reinforcement member, the colliding object determination device comprising:
a sensor located in a front portion of the vehicle for measuring a collision state quantity correlating with a collision load generated in a collision of a colliding body with the vehicle; and
a determination circuit for determining whether the colliding body is a pedestrian based on the measured collision state quantity, wherein the determination circuit determines a kind of the colliding body solely based on the collision load applied to an upper half region of a front end face of the bumper reinforcement member, wherein the sensor includes:
an optical fiber that extends in a side-to-side direction of the vehicle in the front portion of the vehicle and that is deformed in the collision of the colliding body with the vehicle;
a light-emitting circuit section that introduces light to the optical fiber; and
a light-receiving circuit section that converts the light output from the optical fiber into an electric quantity.

11. The colliding object determination device as in claim 10, wherein
the light-emitting circuit section and the light-receiving circuit section are located on one side of the vehicle with respect to the side-to-side direction of the vehicle, and
the optical fiber is bent at least once to make at least one U-shaped portion thereof, such that the optical fiber provides at least one outward fiber part and at least one homeward fiber part at respective positions different from each other with respect to a vertical direction.

12. The colliding object determination device as in claim 7, wherein the sensor is located on the upper half region of the front end face of the bumper reinforcement member but a lower half region of the front end face of the bumper reinforcement member.

13. The colliding object determination device as in claim 1, wherein
the sensor is interposed between the front end face of the bumper reinforcement member and a rear end face of a bumper absorber of the vehicle, and
the sensor is a collision load sensor for sensing the collision load.

14. A colliding object determination device for a vehicle having a bumper reinforcement member, the colliding object determination device comprising:
a sensor located in a front portion of the vehicle for measuring a collision state quantity correlating with a collision load generated in a collision of a colliding body with the vehicle; and
a determination circuit for determining whether the colliding body is a pedestrian based on the measured collision state quantity, wherein
the sensor is located on an upper half region of a front end face of the bumper reinforcement member, the device further comprising:
a load transmission plate between a rear end face of a bumper absorber of the vehicle and the sensor, the load transmission plate having higher rigidity than the bumper absorber.

15. A colliding object determination device for a vehicle having a bumper reinforcement member, the colliding object determination device comprising:
a sensor located in a front portion of the vehicle for measuring a collision state quantity correlating with a collision load generated in a collision of a colliding body with the vehicle; and
a determination circuit for determining whether the colliding body is a pedestrian based on the measured collision state quantity, wherein
the sensor is located on an upper half region of a front end face of the bumper reinforcement member,
the sensor is located in front of a certain part of the upper half region of the front end face of the bumper reinforcement member, the certain part having higher rigidity than the other part of the upper half region of the front end face of the bumper reinforcement member,
the sensor is set at the same height as a part of the bumper reinforcement member consisting of an upper side wall and a rib provided below the upper side wall.

16. The colliding object determination device as in claim 2, wherein
the certain part having the higher rigidity is provided by an upper side wall of the bumper reinforcement member and a rib of the bumper reinforcement member provided below the upper side wall.

17. The colliding object determination device as in claim 7, wherein
the sensor is interposed between the front end face of the bumper reinforcement member and a rear end face of a bumper absorber, and
the sensor is a collision load sensor for sensing the collision load.

* * * * *